Feb. 6, 1962 D. RICHMAN 3,020,339

AUTOMATIC TUNING APPARATUS FOR A COLOR TELEVISION RECEIVER

Filed Nov. 18, 1958 2 Sheets-Sheet 1

Feb. 6, 1962 D. RICHMAN 3,020,339

AUTOMATIC TUNING APPARATUS FOR A COLOR TELEVISION RECEIVER

Filed Nov. 18, 1958 2 Sheets-Sheet 2

United States Patent Office 3,020,339

Patented Feb. 6, 1962

3,020,339

AUTOMATIC TUNING APPARATUS FOR A COLOR TELEVISION RECEIVER

Donald Richman, Fresh Meadows, N.Y., assignor to Hazeltine Research, Inc., Chicago, Ill., a corporation of Illinois Filed Nov. 18, 1958, Ser. No. 774,767

4 Claims. (Cl. 178—5.4)

Figure 1:
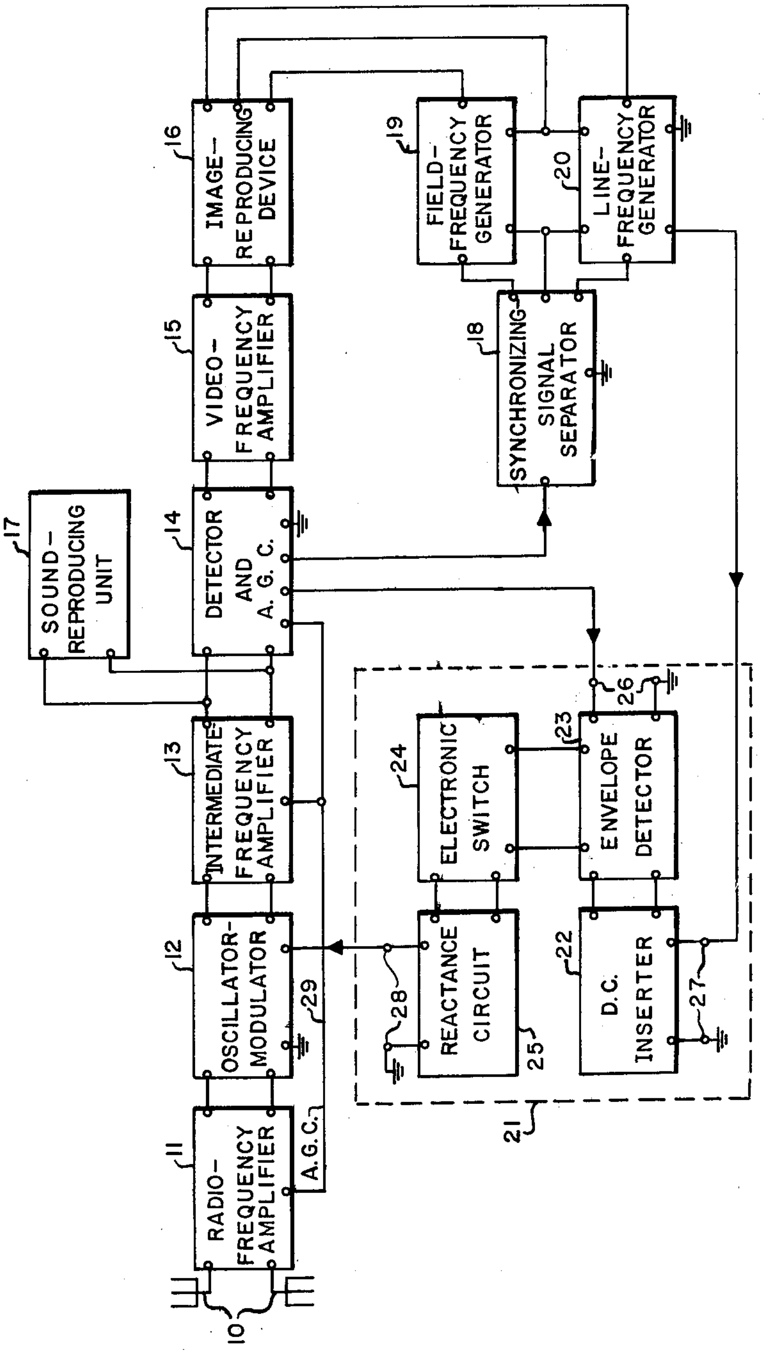

This invention relates to a television receiver apparatus. More specifically, it relates to apparatus in a television receiver which provides automatic tuning of such a receiver for the correct reproduction of either a received monochrome or compatible color-television signal.

It is well known that television receivers are, in actual practice, tuned according to the viewer's subjective standards as to what a good picture should look like. Applicant has found that in receivers of the type using relatively narrow intermediate-frequency pass bands, this subjective test produces two desirable tuning settings, one for monochrome signal reception and another for color signal reception. Since the tuning limitations for compatible color signal reception are more exacting than for monochrome signal reception, the color setting generally corresponds more closely to the normal tuning relationship, namely that setting at which the set is designed to operate. The monochrome setting may often be the tuning relationship preferred by the viewer because of the resulting enhanced sharpness of the picture which may result from a deliberate detuning of the set. By tuning relationship is meant the position of the intermediate-frequency picture carrier relative to the intermediate-frequency pass band. The resulting difficulty arising from these two desirable settings will now be considered. Assuming that a person is viewing a television receiver which has narrow intermediate-frequency pass bands and further assuming the reception of a monochrome signal, the viewer generally tunes the set so as to obtain the sharpest picture possible without the introduction of visible degradation of the picture by the sound carrier. As previously stated, this corresponds to significant detuning of the receiver from the normal tuning relationship. When a change is made in the received signal, as from a monochrome to a color signal, an interference pattern is noticed in the picture, which pattern may consist of alternate bright and dark areas throughout the picture. This interference pattern arises from a beat-note signal resulting from the presence of the newly introduced color subcarrier adjacent to the sound carrier. It is now necessary for the viewer to retune the set until this undesired pattern disappears. This new setting, as previously mentioned, generally conforms to the normal or correct tuning relationship of the receiver. Later, when the color signal ceases and the monochrome signal returns, it becomes beneficial for the viewer to again retune the set for the desired enhanced sharpness in the monochrome picture. Thus it is seen that there are two tuning relationships in a television receiver that give best performance. One is during monochrome signal reception and will be hereinafter referred to as the preferred tuning relationship, and the other is during color signal reception and will be hereinafter referred to as the normal tuning relationship. It is understood that this dual relationship can exist in both monochrome and color receivers having narrow intermediate-frequency pass bands.

It is an object of the present invention to provide a new and improved automatic tuning means for either color or monochrome television receivers which eliminates the need for manually tuning the receivers to settings dependent on the type of received signal.

It is another object of the present invention to provide apparatus for detecting the presence of a received color subcarrier signal and for tuning the receiver to the desired tuning relationship, which relationship is dependent on the presence or absence of such a color subcarrier signal.

In accordance with the present invention, an automatic tuning apparatus for a television receiver of the type having, with respect to received modulated carrier waves, a normal tuning relationship and another tuning relationship preferred by most users of such receivers but which receiver, when tuned to the latter relationship, exhibits an undesirable beat-note pattern caused by the proximity of sound and color subcarriers when a compatible color-television signal is received comprises a means for manually tuning such a receiver to the received carrier waves, these waves having modulation components which may include the color subcarrier. The apparatus also comprises a means for detecting the presence or absence of the color subcarrier and means responsive to the latter means and coupled to the tuning means for automatically shifting the tuning of the receiver from the preferred relationship to the normal relationship when a received signal changes from a monochrome signal to a color-television signal, and from the normal to the preferred relationship when a received signal changes from a color-television signal to a monochrome signal.

For a better understanding of the present invention, together with other and further objects thereof, reference is had to the following description taken in connection with the accompanying drawings, and its scope will be pointed out in the appended claims.

Figure 2:
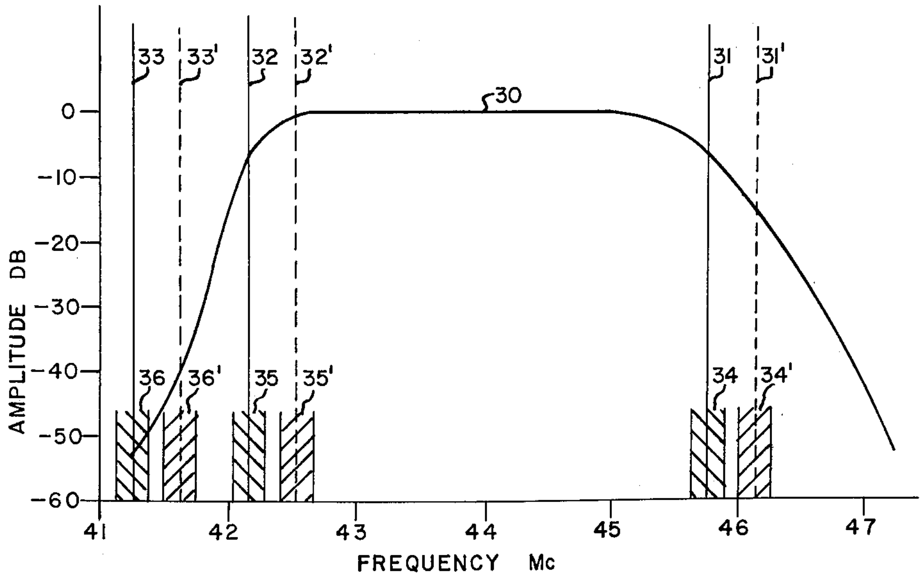

Referring to the drawings:

FIG. 1 is a circuit diagram, partly schematic, of a television receiver illustrating a preferred embodiment of the present invention, and FIG. 2 is a diagram useful in the explanation of the invention.

*Description and operation of FIG. 1 receiver*

Referring now to FIG. 1 of the drawings, the television receiver there represented comprises a receiver of the superheterodyne type including an antenna system 10, 10 coupled to a radio-frequency amplifier 11 of one or more stages. There is coupled to the latter unit a tuning means for manually tuning such a receiver to received carrier waves having modulation components which may include the color subcarrier. Such a tuning means may include oscillator-modulator 12 and an intermediate-frequency amplifier 13 of one or more stages. To the output of this tuning means there are coupled in cascade, in the order named, a detector and automatic-gain-control or AGC supply 14, a video-frequency amplifier 15 of one or more stages, and a cathode-ray tube image-reproducing device 16 of conventional construction provided with the usual line-frequency and field-frequency scanning windings for deflecting the cathode-ray beam in two directions normal to each other. The AGC supply circuit 14 is connected to the input circuits of one or more of the stages in units 11 and 13 by a control circuit conductor 29. Connected to output terminals of the intermediate-frequency amplifier 13 is a conventional sound-reproducing unit 17 which comprises the usual sound intermediate-frequency amplifier, frequency detector, audio-frequency amplifier, and a loudspeaker.

The output of the detector 14 is coupled by means of input terminals 26, 26 to the automatic tuning apparatus 21, constructed in accordance with the present invention and described more fully hereinafter. The automatic tuning apparatus 21 is, in turn, coupled by means of output terminals 28, 28 to the oscillator-modulator 12 of the tuning means. The output of the detector 14 is also connected to field-frequency generator 19 and line-frequency generator 20 through synchronizing-signal separator 18. The outputs of the field-frequency generator 19 and the line-frequency generator 20 are, in turn, connected to the line-frequency and field-frequency scanning windings in the image-reproducing device 16 in a conventional manner. In addition, a locally generated gating signal, commonly referred to as a "flyback pulse," is applied from the line-frequency generator 20 to terminals 27, 27 of the automatic tuning apparatus 21. The units 10–21, inclusive, with the exception of the automatic tuning apparatus 21 which is constructed in accordance with the present invention and will be described in detail hereinafter, may be of conventional construction and operation so that a detailed description and explanation of the operation thereof are unnecessary herein.

Considering briefly, however, the general operation of the above-described receiver as a whole, the signals intercepted by the antenna system 10, 10 are selected and amplified in the radio-frequency amplifier 11 and are supplied to the oscillator-modulator 12 wherein they are converted into intermediate-frequency signals. The latter, in turn, are selectively amplified in the intermediate-frequency amplifier 13 and are delivered to the detector and automatic-gain-control supply 14. The modulation components of the signal are derived by the detector of unit 14 and are supplied to the video-frequency amplifier 15 wherein they are then amplified and supplied to the input circuit of the image-reproducing device 16. A control voltage derived by the automatic-gain-control supply of unit 14 is applied by the control circuit conductor 29 as an automatic-amplification-control bias to the gain-control circuits of units 11 and 13 to maintain the signal input to the detector of unit 14 within a relatively narrow range for a wide range of received signal intensities.

Unit 18 operates to separate the synchronizing signals from the other modulation components of the composite video-frequency signal applied thereto from the detector 14, and also operates to separate the field-synchronizing and line-synchronizing signals from each other, and then supplies these signals to respective ones of the generators 19 and 20. An electron beam is produced by the cathode-ray image-reproducing device 16 and the intensity of this beam is controlled in accordance with the video frequency and control voltages impressed on the control electrode from the video-frequency amplifier 15. Saw-tooth current waves generated in the line-frequency generating system 20 and also in the field-frequency generating system 19 are applied to the scanning windings of the unit 16 to produce scanning fields thereby to deflect the cathode-ray beam of that unit in two directions normal to each other to trace a rectilinear scanning pattern on the screen of the tube and thereby construct the translated picture. The sound intermediate-frequency amplifier 13 and are delivered to the signal-reproducing unit 17 wherein it is amplified. The audio-frequency modulation components are derived in a conventional manner by the frequency detector of that unit and are then applied to the audio-frequency amplifier thereof for amplification and application to the loudspeaker for conversion to sound.

*Description of tuning apparatus 21 of FIG. 1*

Referring now more particularly to the automatic tuning apparatus 21 embodying one form of the present invention, the apparatus comprises means which may include an envelope detector 23 and a D.C. inserter 22 for detecting the presence or absence of a color subcarrier in a received television signal. The line-frequency generator 20 is coupled through input terminals 27, 27 to the input of D.C. inserter 22 to provide thereto locally generated gating signals for a reason to be more fully considered hereinafter. Inserter 22 may be constructed in a conventional manner to develop an output signal comprising a D.C. potential and a gating potential of substantially shorter duration than that of the D.C. potential, which signal is applied to one input circuit of detector 23. A conventional inserter useful in the present instance is illustrated at pages 11–43 of Television Engineering Handbook, by D. G. Fink, published by McGraw-Hill, 1957. Another input circuit of detector 23 is supplied with the detected modulation components from detector 14 by means of input terminals 26, 26. This latter input circuit is designed to have a tuned pass band which will pass substantially only signals having a frequency equal to the color subcarrier. Detector 23 may be conventionally designed to include, in addition to the tuned input circuit, a diode envelope detector which develops an output signal during the coincidence in time of the aforementioned gating potential at the one input circuit and a signal having a frequency equal suitable detector circuit is illustrated in Fundamentals of Vacuum Tubes, by A. V. Eastman, published by McGraw-Hill, 1949, at page 564. The gating potential may be applied to detector 23 to coincide with a supplied color burst so that the output signal from detector 23 would be representative of the presence or absence of such a color burst.

The output signal from detector 23 is applied to electronic switch 24, which switch is of conventional design, to develop a potential dependent on the signal from detector 23. Such a potential may be of the type having two amplitude values, such values corresponding to the presence or absence of an input signal from detector 23. Such a switch may be a well-known filter network developing a D.C. potential from the output of detector 23 as illustrated by capacitor C and resistor $R_L$ of the detector circuit referred to above in the Eastman reference. This potential is supplied to reactance circuit 25 wherein a control signal is developed, which is then supplied to the oscillator-modulator 12 of the manual tuning means by way of the output terminals 28, 28. Reactance circuit 25 is designed in a conventional manner as illustrated at page 13–21 of the Fink reference to be responsive to the output of switch 24 to develop a control signal which, when applied to oscillator-modulator 12, changes the frequency of oscillation of the local oscillator by an amount which automatically shifts the tuning of the receiver from the preferred relationship to the normal relationship when a received signal changes from a monochrome signal to a color-television signal and from the normal to the preferred relationship when a received signal changes from a color signal to a monochrome signal. The circuits 23–25, inclusive, are of conventional design and operate in a conventional manner, which operation will be considered more fully hereinafter.

*Operation of tuning apparatus 21 of FIG. 1*

Prior to considering the operation of the tuning apparatus 21 it would be helpful to consider in more detail the problem concerned. In present-day monochrome receiver practice it is conventional to design intermediate-frequency amplifiers to have relatively narrow pass bands. With reference to FIG. 2, wherein the drawing represents such an intermediate-frequency pass band, the aforementioned tuning relationship is more clearly illustrated. The abscissa in this figure corresponds to frequency in megacycles and the ordinate corresponds to the amplitude response in decibles of attenuation in the intermediate-frequency amplifier 13 relative to a reference value. The normal tuning relationship is shown by the position of the intermediate-frequency picture carrier 31 relative to the amplitude response curve 30. For a received television signal this frequency is conventionally chosen to be 45.75 megacycles. The sound carrier 33 in the intermediate-frequency amplifier 13 is positioned 4.5 megacycles below the picture carrier or at 41.25 megacycles.

However, when a viewer tunes his set to a monochrome signal, not knowing when this illustrated normal relationship is reached, he tunes it for what is to him the most pleasing picture. It has been found that the most pleasing picture is one in which the sharpness is slightly overemphasized. This corresponds to a significant detuning of the receiver whereby a preferred tuning relationship is arrived at which is illustrated by the position of picture carrier 31'. It is further found that the amount of detuning effected is dependent on the signal-to-noise ratio of the received signal. Thus the viewer may detune the set to any setting, for example, within the region 34'. It will be noticed that the sound carrier has moved up the slope of the amplitude pass band response curve 30 to a new position 33', and in the region 36'. Thus it is clear that there are two tuning relationships at which the set may operate, both the normal and preferred.

Now the reason for the need for retuning the set for the reception of a color signal will be considered. The increased sound carrier signal amplitude does not introduce undesired effects in the picture comparable to what is produced on color transmissions since in the monochrome signal there are no signals adjacent in frequency to the sound carrier which, when mixed in a tuning circuit, produce a difference-frequency or beat-note signal small enough in frequency to pass through the video channel. However, when color subcarrier 32 is introduced, since it is only 920 kilocycles away from the sound carrier, a difference frequency of 920 kilocycles results in the video signal which, if not suppressed sufficiently in amplitude relative to the desired video signal, will produce visible effects in the resulting picture. Referring again to FIG. 2, if the subcarrier is introduced at the position 32' within region 35' during the time the receiver is detuned to the preferred relationship, it can be seen that since the sound carrier and color subcarrier appear relatively high up the slope of the response curve 30, the resultant 920 kilocycle beat-note signal will be of significantly greater amplitude than if the two carrier waves were in the normal frequency positions 32, 33 within regions 35, 36. This beat-note signal is detected by the video detector and is now large enough in amplitude to produce a noticeable pattern in the picture. Therefore, it now becomes necessary for the viewer to retune the receiver until the pattern disappears. In order to do this, the sound carrier and color subcarrier must be effectively moved back down the slope to a position where the resultant beat note is sufficiently reduced in amplitude to have no effect on the picture. This is accomplished by retuning the receiver so that the picture carrier falls within the region 34. Since the sound and color carrier frequencies are fixed relative to the picture carrier frequency, these former carriers are returned to regions 36 and 35. The beat-note signal is now reduced sufficiently in amplitude relative to the desired video signal to eliminate any effect it might have on the picture.

Referring again to FIG. 1, the operation of the automatic tuning apparatus will now be considered. The D.C. inserter 22 develops from the flyback pulse supplied at input terminals 27, 27 an average potential which, when suitably applied to the detector 23, prevents the detector from developing any output signal representative of any signal appearing at input terminals 26, 26 and which input signal might be of a frequency which is passed by the tuned input circuit of detector 23, except during the peak of the flyback pulse when the detector is enabled to produce an output signal from any signal passed by the tuned input circuit. The flyback pulse develops the gating potential in D.C. inserter 22 at a time such that when the color burst, consisting of a short continuous wave signal at the frequency of the color subcarrier signal, is transmitted and therefore supplied at terminals 26, 26, the detector 23 passes this burst through the tuned input circuit and develops therefrom an output signal which it applies to switch 24. Switch 24 develops from the output signal of detector 23 one of two predetermined potentials which is applied to reactance circuit 25. Reactance circuit 25 develops therefrom a control signal which, when applied to the local oscillator of the oscillator-modulator 12 maintains its frequency of oscillation at one of two predetermined values to keep the receiver tuned to the normal or preferred relationship dependent on whether a color or monochrome television signal is being received.

It will be understood that there are many different types of apparatus which may be utilized for the purpose indicated by this invention. For instance, the detector might be a normally nonconducting multi-electrode coincidence tube gated on by the flyback pulse, without the need for a separate D.C. inserter. The reactance circuit might comprise a reactance tube controlled by the electronic switch or it might be an extra tuning inductor in the circuit of the local oscillator in the unit 12, which inductor might be switched into the local oscillator circuit by a normally nonconducting diode located in electronic switch 24. Also, if the automatic tuning apparatus 21 is utilized in a color-television receiver, the signal representative of the color burst, such as appears at the output of detector 23, might instead be taken from presently existing color burst detector equipment in the color-television receiver.

Thus it is seen that with the addition of relatively simple equipment, monochrome receivers and also color receivers, which use relatively narrow intermediate-frequency pass bands, may be made receptive to both monochrome and color-television reception without the need for manually retuning the set to compensate for any particular type of signal reception.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Automatic tuning apparatus for a television receiver of the type having, with respect to received modulated carrier waves, a normal tuning relationship and another tuning relationship preferred by most users of such receivers but which receiver, when tuned to the latter relationship, exhibits an undesirable beat-note pattern caused by the proximity of sound and color subcarriers when a compatibile color-television signal is received, the apparatus comprising: means for manually tuning such a receiver to the received carrier waves, said waves having modulation components which may include the color subcarrier; means for detecting the presence or absence of said color subcarrier; and means responsive to the latter means and coupled to the tuning means for automatically shifting the tuning of the receiver from said preferred relationship to said normal relationship when a received signal changes from a monochrome signal to a color-television signal and from said normal to said preferred relationship when a received signal changes from a color-television signal to a monochrome signal.

2. Automatic tuning apparatus for a television receiver of the type having, with respect to received modulated carrier waves, a normal tuning relationship and another tuning relationship preferred by most users of such receivers but which receiver, when tuned to the latter relationship, exhibits an undesirable beat-note pattern caused by the proximity of sound and color subcarriers when a compatibile color-television signal is received, the apparatus comprising: means for manually tuning such a receiver to the received carrier waves, said waves having modulation components which may include a color burst having a frequency equal to the color subcarrier; means for supplying a gating signal; means responsive jointly to the gating signal and the color burst for developing during the coincidence in time of said signal and said burst an output signal representative of the presence or absence of said color burst; and means responsive to the latter means and coupled to the tuning means for automatically shifting the tuning of the receiver from said preferred relationship to said normal relationship when a received signal changes from a monochrome signal to a color-television signal and from said normal to said preferred relationship when a received signal changes from a color-television signal to a monochrome signal.

3. Automatic tuning apparatus for a television receiver of the type having, with respect to received carrier waves, a normal tuning relationship and another tuning relationship preferred by most users of such receivers but which receiver, when tuned to the latter relationship, exhibits an undesirable beat-note pattern caused by the proximity of sound and color subcarriers when a compatible color-television signal is received, the apparatus comprising: means for manually tuning such a receiver to said received carrier waves, said waves having modulation components which may include said color subcarrier; means for supplying a gating signal; means including an envelope detector made operative by said gating signal and having an input circuit which will pass substantially only those signals having a frequency equal to the color subcarrier, said means being responsive jointly to said modulation components and said gating signal for developing an output signal representative of the presence or absence of said color subcarrier; and means responsive to the latter means and coupled to the tuning means for automatically shifting the tuning of the receiver from said preferred relationship to said normal relationship when a received signal changes from a monochrome signal to a color-television signal and from said normal to said preferred relationship when a received signal changes from a color-television signal to a monochrome signal.

4. Automatic tuning apparatus for a television receiver of the type having, with respect to received carrier waves, a normal tuning relationship and another tuning relationship preferred by most users of such receivers but which receiver, when tuned to the latter relationship, exhibits an undesirable beat-note pattern caused by the proximity of sound and color subcarriers when a compatible color-television signal is received, the apparatus comprising: means for manually tuning such a receiver to said received carrier waves, said waves having modulation components which may include said color subcarrier; means responsive to said modulation components for developing therefrom a locally generated gating signal; means including an envelope detector responsive jointly to said gating signal and said modulation components for developing an output signal representative of the presence of said color subcarrier; and means including an electronic switch and a reactance circuit coupled in cascade between said envelope detector and said tuning means and responsive to said output signal for automatically shifting the tuning of the receiver from said preferred relationship to said normal relationship when a received signal changes from a monochrome signal to a color-television signal and from said normal to said preferred relationship when a received signal changes from a color-television signal to a monochrome signal.

References Cited in the file of this patent

UNITED STATES PATENTS

| | | |
|---|---|---|
| 2,357,984 | Travis | Sept. 12, 1944 |
| 2,714,132 | Fredendall | July 26, 1955 |
| 2,750,440 | Sziklai | June 12, 1956 |
| 2,790,848 | Koch | Apr. 30, 1957 |
| 2,917,572 | Stubbe | Dec. 15, 1959 |
| 2,921,120 | Pritchard et al. | Jan. 12, 1960 |